(12) United States Patent
Balz (10) Patent No.: US 10,839,027 B2
(45) Date of Patent: *Nov. 17, 2020

(54) SYSTEM AND APPARATUS FOR PROVIDING, VIA CONVENTIONAL WEB BROWSING, BROWSING CAPABILITY FOR SEARCH ENGINE WEB CRAWLERS BETWEEN REMOTE/VIRTUAL WINDOWS AND FROM REMOTE/VIRTUAL WINDOWS TO CONVENTIONAL HYPERTEXT DOCUMENTS

(71) Applicant: Christopher Mark Balz, Palo Alto, CA (US)

(72) Inventor: Christopher Mark Balz, Palo Alto, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 15/923,763

(22) Filed: Mar. 16, 2018

(65) Prior Publication Data

US 2018/0203930 A1    Jul. 19, 2018

Related U.S. Application Data

(63) Continuation of application No. 14/201,564, filed on Mar. 7, 2014, now Pat. No. 9,971,833.

(60) Provisional application No. 61/775,019, filed on Mar. 8, 2013.

(51) Int. Cl.
*G06F 16/951* (2019.01)
*G06F 16/955* (2019.01)
*G06F 3/0481* (2013.01)

(52) U.S. Cl.
CPC .......... *G06F 16/951* (2019.01); *G06F 3/0481* (2013.01); *G06F 16/9566* (2019.01)

(58) Field of Classification Search
CPC .................... G06F 17/30864; G06F 17/30887
USPC ......................................................... 707/709
See application file for complete search history.

(56) References Cited

U.S. PATENT DOCUMENTS

| 9,037,984 | B2 * | 5/2015 | Park .................... H04N 5/44591 |
| | | | 715/760 |
| 9,086,781 | B2 * | 7/2015 | Boegelund .............. H04L 67/02 |
| 9,361,074 | B2 * | 6/2016 | Engel ........................ G06F 8/38 |
| 9,558,021 | B2 * | 1/2017 | Li ........................ G06F 9/45533 |
| 2008/0033996 | A1 * | 2/2008 | Kesari ..................... G06F 40/14 |

(Continued)

*Primary Examiner* — Sheree N Brown
(74) *Attorney, Agent, or Firm* — Bryan Fibel (57) ABSTRACT

A system and apparatus is described for directing a search engine web crawler's web view to refresh the top-level container that is currently displaying content presented by a remote computer with new content that a navigational link, within a remote desktop, remote application window, or remote graphical windowing user session, points to. Links can be modified to be recognizable as unique from traditional hyperlinks. Upon navigation action on such a link, by the web crawler viewing the remote graphical computer desktop, remote graphical application window, or remote graphical windowing user session, the Remoting Engine that is providing the remote graphical computer desktop, remote graphical application window, or remote graphical windowing user session, sends a navigation command to the remoting engine client running on the web crawler web view, and reloads a web crawler web view's top level container with content provided at the pop-out link's destination URL or URI.

19 Claims, 5 Drawing Sheets

(56) References Cited

U.S. PATENT DOCUMENTS

| | | | | |
|---|---|---|---|---|
| 2011/0307341 A1* | 12/2011 | Zohar | .................. | G06F 16/958 705/14.73 |
| 2011/0307490 A1* | 12/2011 | Chow | .................. | H04L 61/305 707/741 |
| 2013/0290858 A1* | 10/2013 | Beveridge | ............. | G06F 16/957 715/740 |
| 2014/0195930 A1* | 7/2014 | Rajagopal | .............. | G06Q 50/01 715/753 |
| 2015/0278170 A1* | 10/2015 | Boegelund | ............ | G06F 3/0482 715/205 |

* cited by examiner

SYSTEM AND APPARATUS FOR PROVIDING, VIA CONVENTIONAL WEB BROWSING, BROWSING CAPABILITY FOR SEARCH ENGINE WEB CRAWLERS BETWEEN REMOTE/VIRTUAL WINDOWS AND FROM REMOTE/VIRTUAL WINDOWS TO CONVENTIONAL HYPERTEXT DOCUMENTS

CROSS REFERENCE TO RELATED APPLICATIONS

This application is a Continuation that claims priority from a non provisional U.S. patent application Ser. No. 14/201,564 filed on Mar. 7, 2014. Application Ser. No. 14/201,564 is a non-provisional application that claims priority from a provisional U.S. patent application No. 61/775,019 filed on Mar. 8, 2013.

FIELD OF THE INVENTION

Embodiments of the invention generally relate to generating remote graphical windowing environments on a web view used by a search engine web crawler to retrieve Web content. Specifically, embodiments of the invention relate to directing a search engine web crawler's web view to refresh the top-level container that has currently rendered the content presented by the remote computer with the new content that a navigational link, within the remote desktop, remote application window, or graphical windowing user session, points to.

BACKGROUND

There exists remote desktop software that allows a personal computer's desktop environment to be run on one system while being displayed on a separate client device. Often, this is done so that a human user may view and interact with the desktop of a remote computer. In this arrangement, the client device displays a remotely-presented, virtual, graphical window. It may access a single software application, such as a text editor, or computer game; or an entire computer "graphical desktop", such as one sees when a common desktop computer has completely finished booting. Anything that the user accesses through the window displayed by the client device actually runs on the remote computer desktop or window manager. In contrast to both desktop applications as conventionally used and to conventional "Web applications", in this "remote/virtual application window" ("remote window") scenario the remote computer supplies almost all the "horsepower" for powering the software. The client uses rather generic logic to merely render the graphical user interface (along with any multi-media such as audio), take user input, take device input (such as geographical positioning coordinates, device orientation, or ambient lighting level), and relay all of it to the remote computer. The user may browse web content as usual, using hyperlinks, or any other standard navigational elements (generically termed "links") inside these remote windows.

The same holds true for an automated user such as a search engine web crawler "bot" (also known as a "search engine web crawler", or as a "web spider", or as a "search bot"), in terms of browsing and interacting with this remote content. While rare, it is possible that a search bot would visit a computer desktop. More likely, however, software applications may be delivered in the same manner as a remote desktop, as described above, and those software applications may offer data, information, and content of interest to a search bot.

SUMMARY

Performing navigational action on links within a remote window traditionally results in successively nested remote windows. This results in the substantial waste of resources and degradation of performance from the significant amount of processing power and network capacity required for each successive remote/virtual window. By avoiding these penalties, navigation can be successfully completed in significantly less time, allowing a search bot to process much more web content per unit of time than otherwise would be possible. This will offer an avenue for providers of applications delivered via remote windows to expose their offerings more conveniently for the search engine providers who send out the "search bots", in effect representing a new form of search engine optimization. The present invention satisfies the need for a search bot viewing a remote window to travel or "crawl" between remote windows without this overhead, similar to how a search bot would crawl the Web by clicking on links between Web pages that do not represent remote windows, such as the links between popular Web home pages and their linked web pages.

In accordance with the teachings of the present invention, a system and apparatus for directing a search bot's web view to refresh the top-level container that is currently displaying the content presented by the remote computer with the new content that a link, within the remote window, points to, is provided. The system comprises a client computing device configured to run a remoting engine client, via a search engine web crawler that utilizes a web view in order to fetch and internally render content at given URLs or URIs and a server computing device configured to run a remoting engine hosting a remote graphical computer desktop, remote graphical application window, or remote graphical windowing user session. Such a system is configured to perform establishing a remote graphical computer desktop, remote graphical application window, or remote graphical windowing user session between the client computing device and the server computing device and marking a navigational link, without altering the link's destination URL path or URI path, on the remote graphical computer desktop, remote graphical application window, or remote graphical windowing user session, as a pop-out link, wherein the pop-out link includes an identifier recognizably different from a standard navigational link. Then, upon navigation action on the pop-out link by the search engine web crawler that is viewing the remote graphical computer desktop, remote graphical application window, or remote graphical windowing user session, the system parses, by a link parsing routine executed by a processor, navigation data from the pop-out link, sends, by a processor, the pop-out link navigation data to a Remoting Engine that is providing the remote graphical computer desktop, remote graphical application window, or remote graphical windowing user session, sends, by a processor, over a network, a navigation command to the remoting engine client running on the search engine web crawler web view, and reloads, by a processor, a search engine web crawler web view's top level container with content provided at the pop-out link's destination URL or URI occurs. The pop-out link's destination URL or URI can provide a remote graphical computer desktop, remote graphical application window, or remote graphical windowing user session.

Another embodiment provides for when hosting multiple remote desktops and/or multiple remote application windows and/or multiple remote graphical windowing user sessions, a message sent to the Remoting Engine to reload the search engine web crawler web view's top level container specifies a network port number for a correct remote desktop, remote application window, or remote graphical windowing user session. Additionally, the search bot client can be directed to load a whole web page context on a child of itself, leaving the parent container unaltered by the navigation action, where the child can be an HTML frame, including an iframe.

The navigational link can be modified by overloading one or more pre-existing or predefined HTML attributes, adding a new custom HTML attribute, using one or more HTTP 'GET' parameters, or including a special identifier in place of a standard Internet Protocol scheme identifier 'http' or 'https'.

BRIEF DESCRIPTION OF THE DRAWINGS

The accompanying drawings taken in conjunction with the detailed description will assist in making the advantages and aspects of the disclosure more apparent.

FIG. 5 is a block diagram showing how navigational action on a pop-out link directs the search bot's local web browser/web view to refresh the top-level container that is currently directly displaying the content presented by the remote computer with the new content that the link points to.

DETAILED DESCRIPTION

Reference will now be made in detail to the present embodiments discussed herein, illustrated in the accompanying drawings. The embodiments are described below to explain the disclosed system and apparatus by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

System and apparatus for directing a search engine bot's web view to refresh the top-level container that is currently displaying the content presented by the remote computer with the new content that a link, within the remote desktop, remote application window, or remote graphical windowing user session, points to, or to show the new content in a top-level container of a child web view.

The descriptions of the first four Figures provide a basic, high-level explanation of general embodiments. The description of the last Figure, FIG. 5, provides a more detailed explanation of embodiments.

Figure 1:
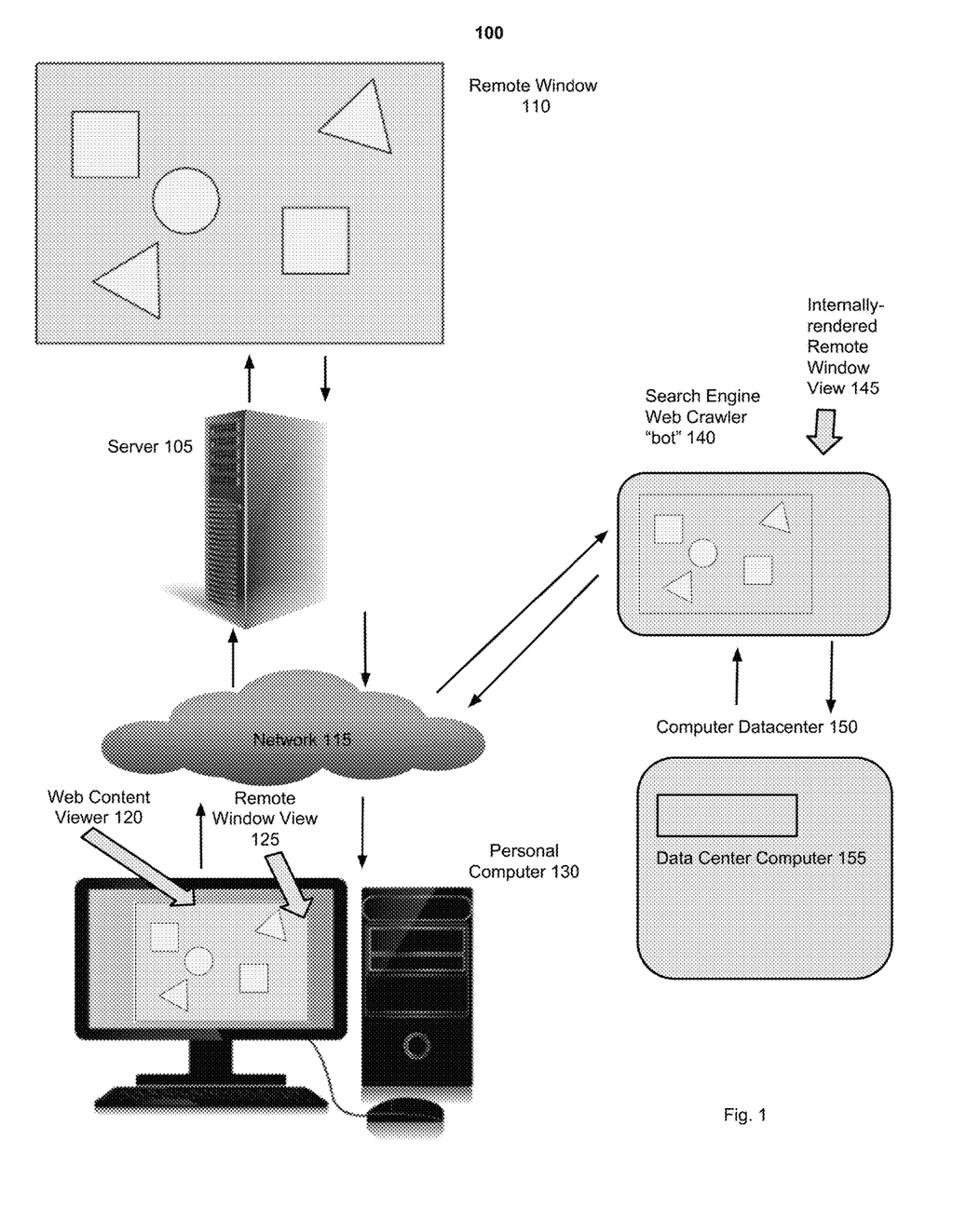
FIG. 1 is a block diagram depicting a remote server, accessible through a network, and providing a view of its graphical application remote window to a search bot, and also a simultaneous view of the same graphical application remote window to a human user at their personal computer.

FIG. 1 is a block diagram depicting a typical client server system 100 where the invention would be used. It consists of a remote server 105, accessible through a network 115 such as the Internet or a local-TCP/IP-based network, and two clients, Personal Computer 130 and Data Center Computer 155. The remote server 105 provides a view of a given application (Remote Window View 110) that provides content of interest to the search application. As depicted in Remote Window View 110, this could be a software application that the search engine would index for later searching. For example, the software application could be an action computer game that the search engine would index for later searching by those interested in reviewing particular points of interest (such as specific game challenge points) in the action game. Access to the computer game could be provided live by the game host remote Server 105, so that the game host would neither need to store a recorded copy of the gameplay, nor provide access software for that copy. The client, Data Center Computer 155, accesses this Remote Application View 110 via Search Engine Web Crawler "Bot" 140, which shows Internally-rendered Remote Window View 145. A human user at Personal Computer 130 uses the software application, and under the terms of the software license agreement, has agreed to allowing their activity to be loaded ("viewed") and searched by search bots such as Search Engine Web Crawler "Bot" 140. For example, this could be a user playing a computer software action video game who has given permission for their gameplay to be searched by a search bot. A search bot 140 will typically run on a high-powered computer 155 located at an industrial data center, but could also run on various computing devices that differ in kind, for example in order to make use of excess available compute capacity on these devices. Such usable client devices 130, 155 include, but are not limited to, smart phones, tablets, connected entertainment devices (such as smart tvs), and wearable/implants. The Search Engine Web Crawler 140 internally renders the user activity in Internally-rendered Remote Window View 145, so that it can be indexed for later searches (for example, for gameplay action scenes and video clips). That rendering is identical to that shown to the human user via Web Content Viewer 120, in Remote Window View 125. Since typically, for reasons of efficiency, a search bot is run in "headless" mode (meaning, drawing no visible representation of itself on a computer screen), these renderings, including in a child web browser window, web browser tab, or HTML frame, including an inline frame ("iframe"), are not visible to a human user. However, they are provided by the search bot for the purpose of accurately representing the content it seeks to crawl, so that the search engine indexing can be as accurate as possible. In practice at scale, Data Center Computer 155 would typically be housed in Computer Data Center 150, with other data center computers applied to the same type of task.

Other beneficial use-cases exist. In the case where an educational instructor were using their remote computer desktop as an instructional aide, the search target (the remote window) could be a remote computer desktop. Also, the remote window could be a non-application, non-desktop graphical window, such as a Display Manager program that presents a graphical window to the user for the purpose of logging into the graphical desktop, upon which run applications. The latter represents an example of what is known in the art as a "graphical windowing user session".

While interacting with the remote window, a search bot may click on a hyperlink pointing to another remote window. The search bot may also, in the most general case of all navigational targets, click on a hyperlink pointing to a non-remotely-hosted resource such as a conventional web page. Importantly, the hyperlink (represented in HTML as an HTML 'anchor' tag) is merely one example of a possible navigational code element. It is used as an example here because it is the most common, and the original, way of navigating the World Wide Web. However, many other elements, such as the HTML 'button', can be used as navigational elements by linking them to other code that will execute the desired navigational action. For the purposes here, the only important factor is the navigational action of when a search bot activates the navigational element, usually but not exclusively by clicking.

The search bot may interact with the application using known pattern recognition techniques to guide its internal, local, and virtual mouse and keyboard and/or any other virtual input device so that they can make the desired navigations and inputs to reveal data, information, and content for search engine indexing. The search bot can direct its web browser to perform a click action on recognized targets of the screen since, under standard web browser technology, those are exposed as Cartesian coordinates where the (virtual) mouse pointer can be moved and then clicked. Additionally, under the same principle, the search bot can perform other events, such as mouseover, hover, tap, or touch.

Figure 2:
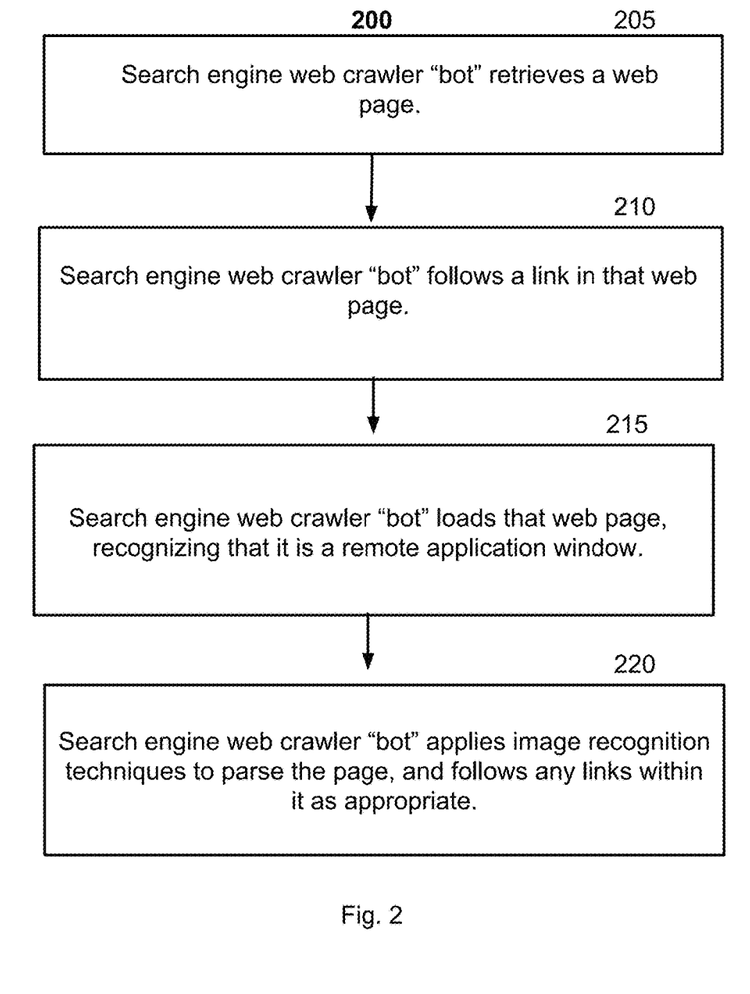
FIG. 2 is a flowchart depicting the basic use case where a search bot brings up a remote application, using its internal web browser/web view, and navigates a link on the remote application.

FIG. 2 is a flowchart 200 showing a process of accessing such remote application systems as displayed in FIG. 1. The search bot retrieves a web page 205. Then the search bot follows a link in that web page 210, for example, to a remote application 215. The search bot recognizes 215 that the hypertext document ("html page") represents a remote window, and applies the special parsing and recognition techniques 220. The search bot knows to do this because it recognizes a standardized marking in the web page that indicates that the page is a remote window. This could be an HTML meta tag, embedded in the hypertext document, that has attributes assigned to special values. In this scenario, the tag's 'name' attribute would have the value 'robots'. The tag's 'content' attribute would have the value 'remote-window', or a similar standard value that indicates that the web page is a remote window.

As conventionally implemented, clicking on links that exist within a remote window and point to a different remote window results in successively nested remote windows. Subjects of search bots can be made to link to remote windows. Given a sufficient reduction in network latency, major online news pages may be deployed as remote windows. In this scenario, where a major amount of content (such as current events news) is embedded within remote windows, the ability to avoid nesting overhead becomes critical to accessing the information offered.

Since each remote window requires a significant amount of processing power and network capacity to effectuate, the nesting would represent a substantial waste of resources and a degradation of performance for the search bot. It would be preferable if the search bot were able to load more data, information, and content faster, without waiting the extra time required by the overhead described above, because this time represents an investment on the part of the sponsor of the search bot in maintaining it as a running program. Additionally, presenting a nested window represents additional cost to the content provider hosting the link, as then the content provider must devote computational resources (including CPU time and memory) to render, for the search bot, the linked content, whereas with the benefit of the present invention, only the provider of the linked content itself would have to render the linked content. For that to happen, the search bot must load the linked content directly, instead of through the remote window of the content provider that hosts the link. In order to be able to load the linked content directly, instead of through the current enclosing remote window, the search bot needs a special kind of link that indicates that the resource must be loaded outside the current enclosing remote window, termed a pop-out link.

Figure 3:
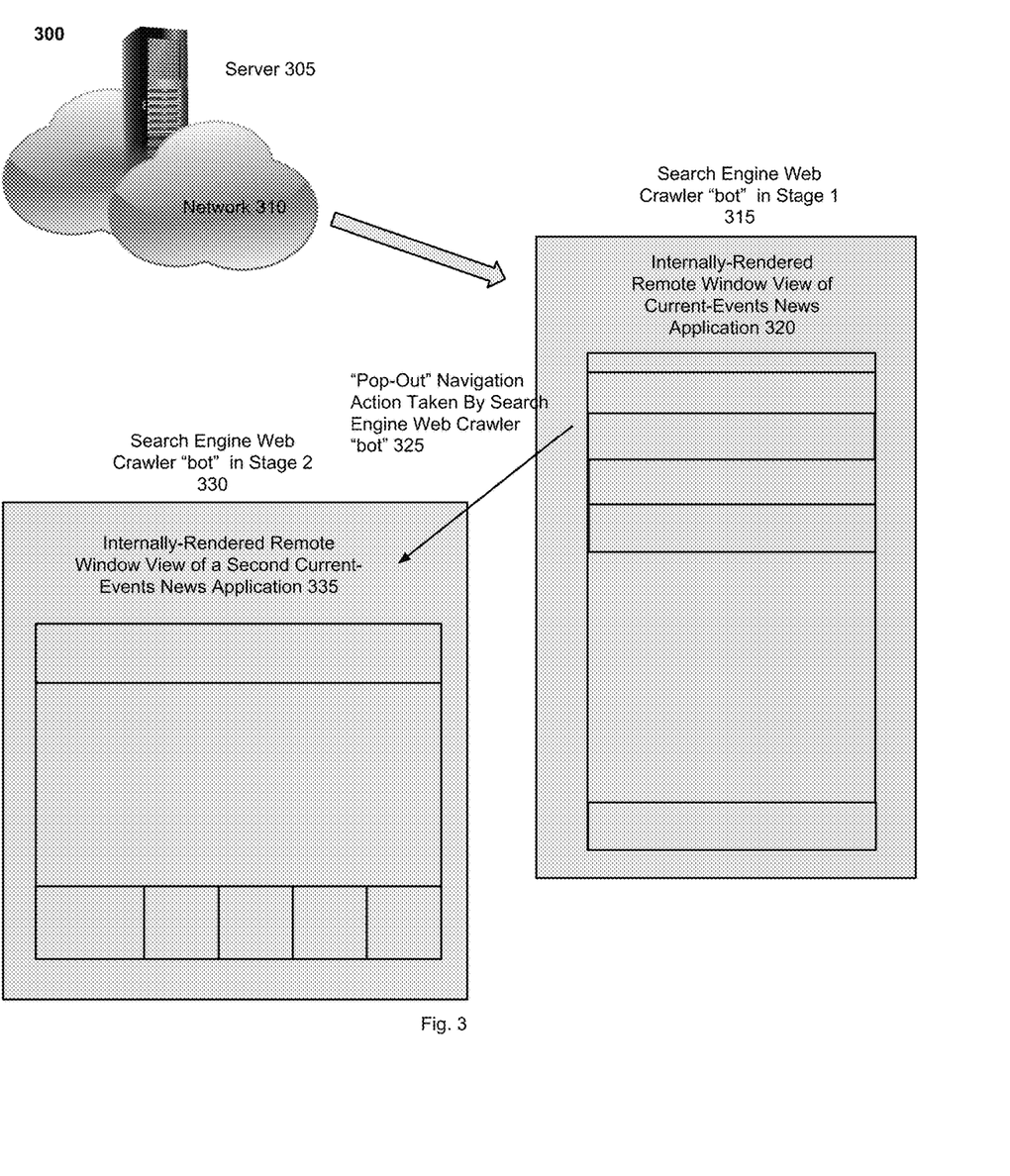
FIG. 3 is a block diagram showing how the search bot avoids the nesting overhead that occurs when a search engine bot brings up a remote application in the general manner shown in FIG. 2 and clicks on a link in a remote application running on a remote server equipped with the present invention.

FIG. 3 depicts a scenario where a Server 305 offers, over a Network 310 (such as the Internet or a local-TCP/IP-based network), a remote window view of a current-events news application Internally-Rendered Remote Window View of Current-Events News Application 320, such as one covering the Olympics sporting event. Such an application, delivered via a remote window, could offer news, updates, and user-community discussion about the Olympics sporting event. A Search Engine Web Crawler "bot" in Stage 1 315 ("search bot" in Stage 1) of the scenario navigates ("Pop-Out" Navigation Action Taken by Search Engine Web Crawler "bot" 325) using a link presented by the remote window. This link leads to a piece of content located on a different current-events news application that is also delivered as a remote window, Internally-Rendered Remote Window View of a Second Current-Events News Application 335. The pop-out functionality is actuated when that link is navigated, allowing the search bot to load the destination current-events news application directly (as a remote window), instead of viewing it through the extra layer of the original remote window.

Figure 4:
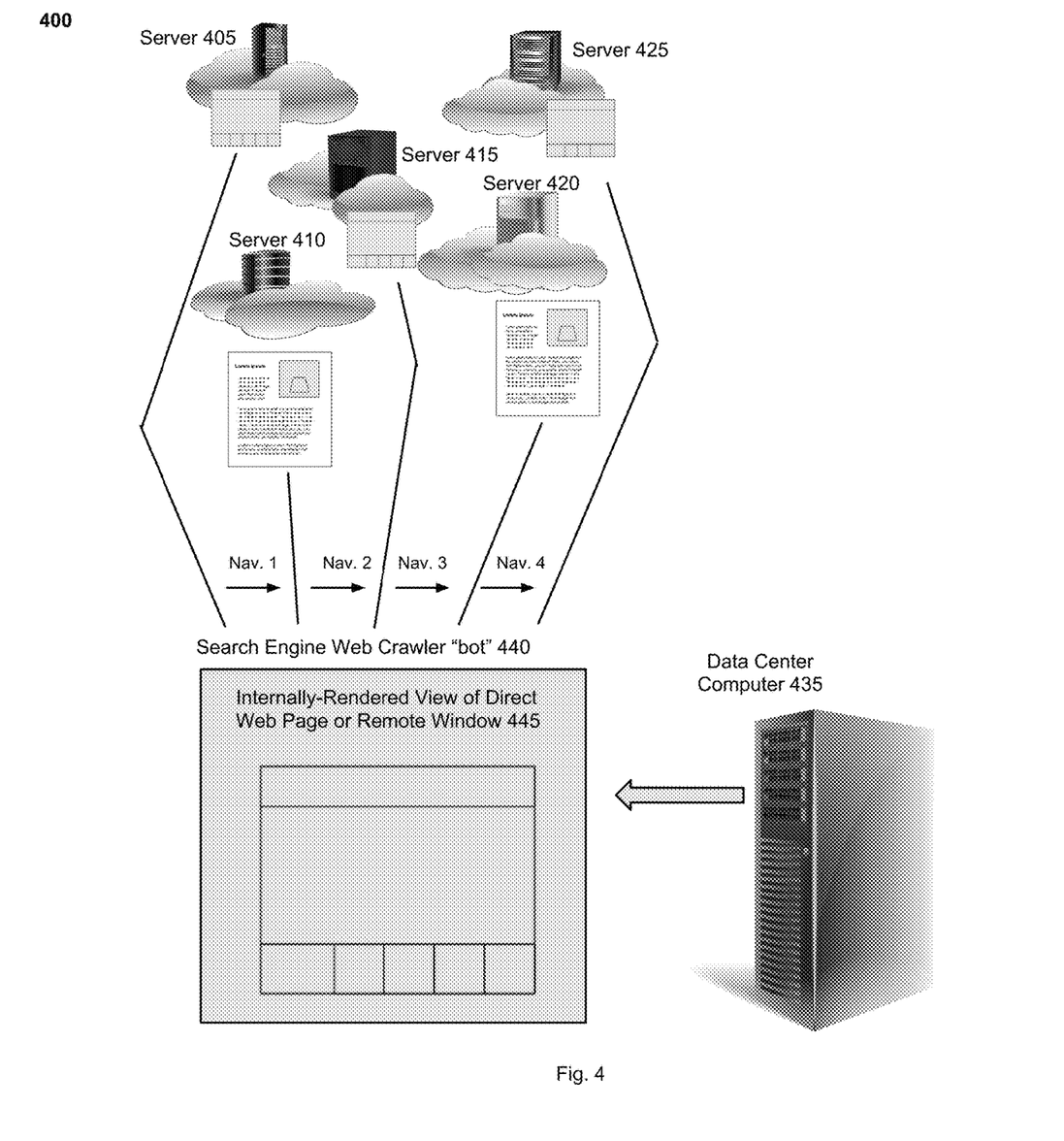
FIG. 4 is a block diagram depicting a plurality of remote servers on a network, each providing either a remote window or a direct ("conventional") web page to remote clients, and a client computer used by a search bot to "crawl" the links between the remote applications and direct web pages, via the internal web browser/web view that runs on the search bot.
Figure 5:
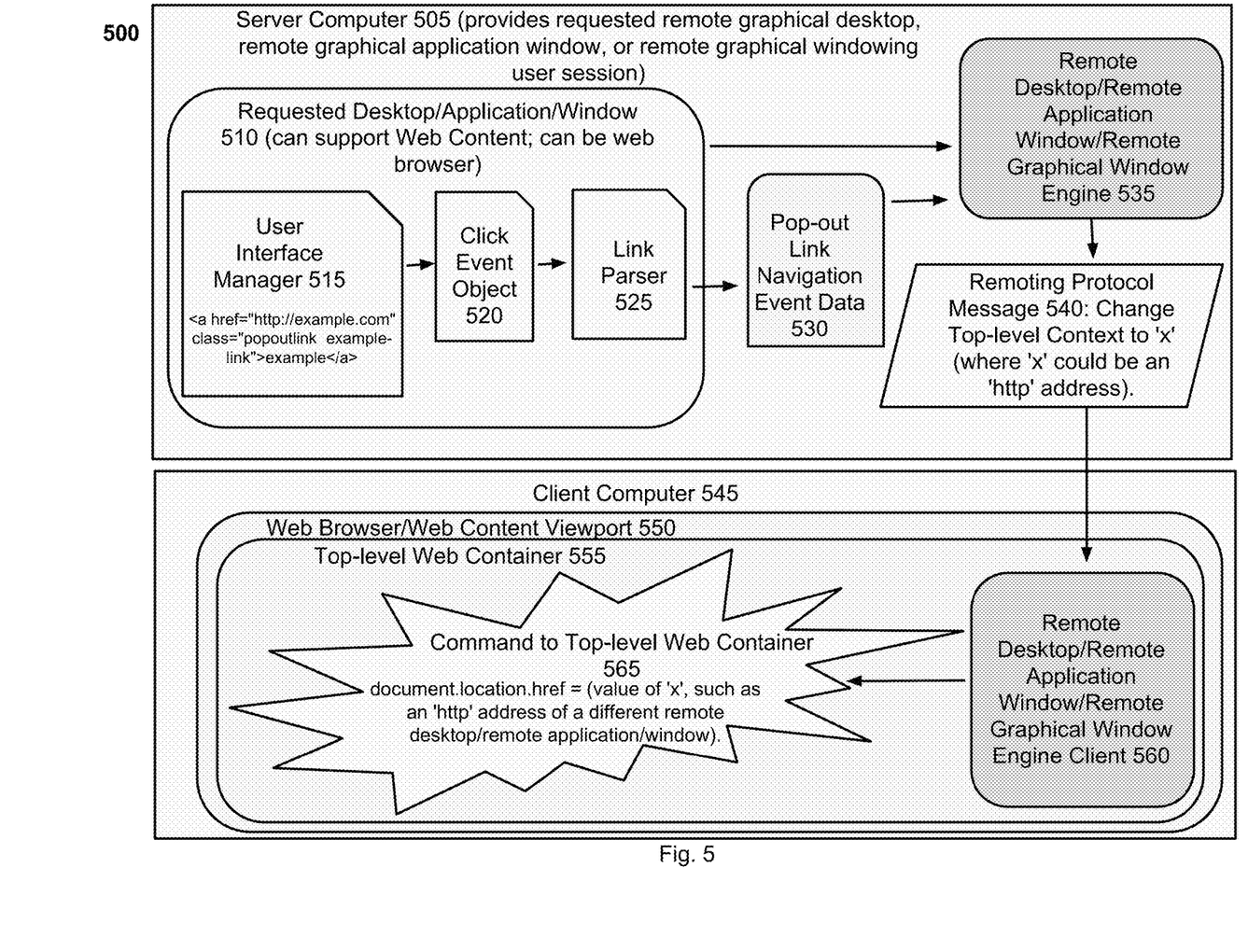

FIG. 4 depicts the usage 400 of a plurality of remote servers (Server 405, Server 410, Server 415, Server 420, Server 425) on a network such as the Internet or a local-TCP/IP-based network. Each provides their own remote window or direct web page view to search bots, such as that running on Data Center Computer 435, although each of these could equally be a graphical windowing user session, such as a Display Manager for allowing a user to log in to a desktop. Importantly, each remote application window or remote graphical windowing user session may hold the exact same, or similar, or completely different content. A search bot at the client Data Center Computer 435 "crawls", using Search Engine Web Crawler "bot" 440 ("search bot"), between the remote window and/or direct web page views via the search bot's internal web browser, sequentially performing navigation actions 'Nav. 1' through 'Nav. 4' in numerical order, resulting in successively visiting remote servers Server 405 through Server 425, and receiving each remote server's remote window and/or direct web view on the internal web browser, which renders Internally-Rendered View of Web Page or Remote Window 445. Although the ordering is not significant, for the purpose of illustration, "Nav. 1" action leads from a remote window view of a current-events news application about the Olympics sporting event (served by Server 405) to a direct (non-remote) web page view containing an article linked on the remote window view of the current-events news application (served by Server 410). The "Nav. 2" navigation action leads from the direct web page view back to a different remote view of the Olympics current-events news application (served by Server 415). The "Nav. 3" action leads from the remote window view of the Olympics news application to a remote window view of an application for viewing tweets about a given topic covered on the Olympics news application (Server 420). The "Nav. 4" action leads to a different remote view of the Olympics current-events news application (served by Server 425). This navigation represents a scenario where the links on each destination can point to a different kind of resource: Some links on the remote window views lead to a direct web page, and some links on the direct web pages lead to a remote window view. Additionally, one of the links navigated on the remote window view of one application leads to a different remote window view of a different application. Importantly, in all cases of navigation from a remote window, extra nesting overhead is avoided. In the case of navigation from one remote window to another, the nesting overhead is avoided as described above. In the case of navigation from a remote window to a conventional web page (a web page that is not a remote window), nesting overhead is avoided by viewing the web page content directly, instead of via a web content viewer running on the remote server hosting the remote window.

On its internal web browser, the search bot may interact at will with the remote window using its internal, virtual keyboard and mouse, and/or any other virtual input device. The search bot may have any number of internal web browsers open at any time, and any number of those may be visiting a remote window, or a conventional ("direct") web page hosted by one of the remote servers.

The preferred embodiment of the present invention allows a remote window to be replaced with a new one upon the search bot's click or other equivalent command or action. This would enable a search bot "viewing" (holding in its computer memory) a remote window to "crawl" between remote windows and conventional web pages similarly to how search bots navigate conventionally by clicking on links between conventional web pages, resulting in a new form of search engine optimization.

As the search bot navigates from server to server, as illustrated in FIG. 4, each successive remote server serves the content it hosts directly to the client, instead of having to pass through the remote server that was first visited. For example, it may be desirable for a search bot to be able to navigate directly from a remote window holding an application such as a current-events news application (described above), to a different remote window that could hold a different application (such as a different news application or an application that sells tickets to the Olympics) hosted on a different remote server. In that scenario, the optimal behavior is for the different remote window to be shown directly from the remote server that natively hosts it, and not through the remote window of the first remote server or a new remote window that could be spawned from the first remote server.

As shown in FIG. 1, gameplay could be searched by a search engine search bot. The search bot could reach the search engine via direct (non-remote) web page link "crawling", and the game may present the search bot with additional links as part of the user-interface of the game itself. To provide another example use, navigational links could be inserted in a computer video game during gameplay, possibly to provide a search bot with the opportunity to navigate to a view of a similar gameplay stage being undertaken by a different player in a different game session of the same game title. To avoid the extra layer of showing such games as embedded in their own remote window, the preferred embodiment will redirect the top-level rendering container of client (in this case, the internal web browser of the search bot) to the URL or URI for the destination game.

As illustrated in FIG. 5, this is accomplished by modifying the applications supporting the links to server computers hosting remote desktops, remote application windows, remote graphical windowing user sessions, or direct (non-remote) webpage views to support, in addition to their current support of regular hyperlinks (specifically, 'http://' links), other links recognized by the remote machine as pop-out links. For example, a link can be made recognizable as a pop-out link by inserting the custom HTML attribute 'popoutlink' in the html tag 'a' (the 'anchor' tag) as in '<a href="http://example.com" popoutlink>example.com</a>'. Another example would be 'popoutlink://' or a similar construction ('pttp://', and so forth) in place of the 'http://' in the example given above. Yet another example, conformant with versions of HTML prior to HTML 5 that are still in rather common use at the time of this writing, since it avoids the use of a custom HTML attribute, would be '<a href="http://example.com" class="popoutlink">example.com</a>'. In the latter example, "popoutlink" is supplied as the sole CSS 'classname' to the HTML attribute 'class', but it does not have to be the only CSS 'classname' supplied, and the order of 'popoutlink' in the list of CSS classnames supplied to the 'class' attribute is not significant. Another example would be an http 'GET' parameter 'popoutlink', so that the Uniform Resource Locatior ("URL") or Uniform Resource Indicator ("URI") of the hyperlink would contain 'popoutlink', such as: "http://example.com?popoutlink&foo=bar" or "http://example.com?foo=bar&popoutlink". This example would be entirely compatible with versions of HTML prior to HTML5 but would pose a slightly additional load upon the server that serves the resource at the URI or URL, and would require any application data identifiers in the list of HTTP GET parameters to not be 'popoutlink' (since that identifier is already used for the purpose explained here). All of the examples cited above have been uniquely modified to qualify as pop-out links.

When a computer program supporting pop-out links, such as Requested Application 510, encounters a pop-out link navigation action, it alerts the remoting engine (Remote Application Window/Remote Graphical Window Engine 535) and passes the URL of the pop-out link (the Web address following the '//' in 'http://' or any of the "pop-out link" equivalents outlined above), along with the value of any other HTML attributes such as 'target', to it. The alerting can be done by use of components that, taken individually, are well-known to those skilled in the art. While the specific implementation may vary depending upon the specific computer languages used by these applications and graphical windowing user sessions, and while it may vary according to the specific application, a basic approach holds across the variations.

In the preferred embodiment, a standard web application client receives a pop-out link navigation directive from the remote computer and directs the top-level user-interface container that currently holds the content served by the remote computer to the resource specified in the navigation directive. The client can be embodied in client software that generally or strictly conforms to the specifications of a web application as defined by the World Wide Web Consortium, that runs on the end user's local computer on a standard web browser or on a web-enabled application, and that is able to execute by using only building blocks made from technologies defined by the World Wide Web Consortium. This is done without plug-ins to the standard web browser that add non-standard rendering technologies, such as Flash (a registered trademark of Adobe Systems Incorporated), or the web part of the web-enabled application. A "standard web browser" or a "standard web view" is equipped to execute a fairly comprehensive suite of program code for delivering web-based software applications, as defined in reasonably up-to-date specifications from the World Wide Web Consortium. "Web-enabled applications" are applications that can host a "standard web view".

The server part of the preferred embodiment would add to its virtualization engine, such as a Virtual Network Computing" ("VNC") server or a Remote Desktop Protocol ("RDP") server, and possibly to its operating system, the capability of accepting and acting upon pop-out link messages, including the URL's or URI's from pop-out links. Pop-out link-enabled applications that run on the server machine's operating system would be capable of differentiating clicks on pop-out links from clicks on links, and would pass a message to either the operating system or directly to the virtualization engine that a pop-out link has been clicked, with the URL or URI of the pop-out link contained as data of the message. This kind of message is sometimes referred to in the art as an "event'. Whether or not the pop-out link message would pass through the operating system and then to the virtualization engine would depend upon the details of the mechanics of the specific type of operating system on the server itself. In either case, the virtualization engine will then transmit the pop-out link navigation command to the client, as described in greater detail below.

Therefore, a detailed example of a preferred embodiment follows where one search bot is using a single remote computer or single remote virtual machine that hosts a remote application window.

The 'curl' program works on many operating systems and serves the purpose of generating HTTP 'GET' requests and receiving the response to the request, if any. 'curl' takes as input a URL or URI, along with any data to be passed as an HTTP 'GET' parameter set with that URL or URI. Then it issues an HTTP request on the network of the machine it is running upon. The application, Requested Application 510, containing the pop-out link clicked upon by the user, passes the data in the link, Pop-out Link Navigation Event Data 530, as part of an HTTP 'GET' request sent by the 'curl' program. A local HTTP server program can hear HTTP 'GET' requests addressed to it. The remoting engine, Remote Application Window/Remote Graphical Window Engine ("remoting engine") 535, can be a program, possibly a Java servlet, running on a local HTTP server. The 'curl' request is addressed to this program. Therefore, the 'GET' request notifies the remoting engine 535, alerting the remoting engine to the need to serve a pop-out link.

To state the above in greater detail: When the application invokes the 'curl' program, it passes (via mechanisms such as Click Event Object 520 and Link Parser 525, detailed below) the data contained in the HTML 'a' element, shown for example in User Interface Manager 515, as an argument to 'curl'. 'curl' then executes the HTTP 'GET' request. The remoting engine 535 supports a facility, which in this case is a Java servlet container, for receiving HTTP 'GET' requests. The 'curl' program is invoked as a stand-alone program on the operating system shell, and it receives the values of the HTML attributes on the pop-out link, including the value of the 'href' attribute that holds the URL or equivalent and other attribute values, such as 'target'.

Alternative embodiments could use a system daemon instead of a stand-alone program such as 'curl'. A daemon would offer the advantage of fastest response time, as a daemon stands at the ready to take any requests, whereas a stand-alone program requires a new operating system-level process to be created and allocated to it each time it is executed.

Since the current use-case entails a search bot operating in the service of a search engine business, the time savings offered by the daemon could be significant if it is generally more than a few percent of the total transaction time, because that will allow the search bot to process proportionally more searchable resources in the same amount of time. It bears noting that a daemon requires extra system administration setup time compared to the equivalent stand-alone program.

An application, which can be written in 'C++', a superset of the 'C' computer language, receives a pop-out link as a data property of an event object, a block of computer memory containing values related to an event, such as a user clicking on a link or pop-out link. The event object, Click Event Object 520, was generated by standard application code (supported by User Interface Manager 515) that runs whenever a user clicks on a link, and loaded by that code with values about the event, such as the HTML attributes existing on the link or pop-out link that was clicked. The application code that creates the event is itself triggered by an event as provided by the 'C' computer language, a subset of C++ that is available to C++ programs.

The event object is passed to a segment of software code known as an "event handler". This event handler, commonly found in the "view" portion of the code of a typical application such as one based on the model-view-controller or model-view-presentation architecture, may need to be modified to support pop-out links. In the case of a typical word-processing program, the event handler will pass the entire URI or URL to a program method called, for example, LoadNavigationTarget, located in a C++ program file.

Because the URL or URI in this program method's signature, for the present example, is of a custom string type 'rtl::NavString&', it lacks the standard 'c_str' method, which is needed for convenient processing of the string. Therefore, it can be converted to a standard C++ string 'url' (below) with the following code, which can be located in an external utility program or library, where 'rNavTarget' is the 'rtl::NavString&' type value:

```
std::string url;
std::stringstream
ss(std::stringstream::in | std::stringstream::out);
ss << rNavTarget;
ss >> url;
```

In the embodiments where a pop-out link identified via an HTTP 'GET' parameter or a protocol identifier is used, the URL or URI can be inspected in the 'LoadNavigationTarget' method by calling a C++ standard template library ("STL") method named 'contains' to search the URL for the presence of '?popoutlink', '&popoutlink', 'pttp://', or 'popoutlink://', or the equivalent. If one of the pop-out link identifying labels are found, then the navigation is that of a pop-out link.

If the other embodiments that rely upon the non-'href' attributes of the HTML 'a' tag are to be used, then the attributes will need to be extracted and examined. This would most commonly be done in the event handler. Some programs may provide the values of the attributes to a method similar to 'LoadNavigationTarget'. In that case, the values would be searched, or marshalled for search, in that program method. In any of the possible embodiments, if an HTML attribute meets the conditions set out above, the application logic would know that a pop-out link was clicked upon.

To implement the Link Parser 525, a separate C++ class can be made to bundle the required functionality. This class could be called "curlit" (from "curl"+"it") and it would provide a method called 'is_executable' that, in an embodiment that supported only a single pop-out link identifier such as the full 'popoutlink' identifier, may look like:

```
bool curlit::is_executable( ) {
    return contains(m_popoutlink, m_attributes);
}
```

In the embodiment above, the 'm_popoutlink' is a private string representation of the pop-out link identifier ('popoutlink'), and 'm_attributes' contains the stringified form of all the values of all the HTML anchor attributes gatherable by the separate calling program's 'LoadURL' method. The C++ STL 'contains' method, supplied with the pop-out link search parameters, searches the attributes and returns a boolean value indicating the presence or absence of a pop-out link.

Example code to create a "curlit" instance in the client program may look like:

```
try {
    curlit c(url);
    if (c.is_executable( ))
        c.execute( );
    else
        ::_LoadNavigationTarget(...); // Where '...' represent the
        arguments to the '_LoadNavigationTarget' method in the
        specific implementation. 'rNavigationTarget' would be among
        these, and is the only one directly relevant.
}
catch ( curlit_exception& ex ) {
    cout << ex.what( ) << endl;
}
```

The above implementation provides error handling with a try-catch block. Errors that must be handled include improperly supplied input, such as an invalid string representation of what should rather be a correct HTML 'a' element with its content. Error checking can be done by means of C++ STL methods such as 'split', in order to break down the contents of a string representing the HTML 'a' element for individual checking. For example, if there is nothing following 'http://', then that invalidates the 'a' element and an exception must be thrown and caught.

The above implementation checks to see if the link represents a pop-out link by using the method, 'is_executable'. If the link is not a pop-out link, the original program method for executing hyperlinks is executed, which in our example, would be renamed in the source code to "_LoadNavigationTarget" from its original name, 'LoadNavigationTarget', in order to avoid a naming conflict with our added implementation, which would take the original name, 'LoadNavigationTarget'.

If the link does represent a pop-out link, the present example embodiment runs the 'execute' method which may look like:

```
int curlit::execute( ) /* throws notexecutable_exception( ); */ {
    if ( !is_executable( ) )
        throw notexecutable_exception( );
    string curl = execute_string( );
    int code = system( curl.c_str( ) );
    return code;
}
```

The above code calls a program method that composes the proper string required for the call to the standard C++ 'system' function. The 'system' function allows the C++ program to run a program on the base system, otherwise known as the operating system or more specifically the "shell" of the operating system ("the shell"). The shell provides the context in which the "curl" program can be started and can execute. The 'return' statement above provides the shell's exit status code for the 'curl' invocation to the calling program.

The 'execute string' method may look like:

```
curlit::execute_string( ) {
    string s = "curl --get";
    if ( m_data.size( )>2 )
        s += " --data "+m_data;
    s += " "+m_url;
    return s;
}
```

The above implementation creates a string that will invoke the 'curl' program on the shell, with the correct inputs.

Since the client will ultimately need the HTTP protocol, any 'pttp' or the like would need to be ignored and replaced with 'http'. Similarly, any lack of 'http://' on the URL would be remedied by prepending the default value, 'http://'. These operations can be done using string manipulation methods from the C++ STL library and standard C++ comparison facilities.

Since HTTP 'GET' requests pass data by means of url encoding and the '?', '&', and '=' special characters, the Pop-out Link Navigation Event Data 530 is specified according to that convention: '?href=http://example.com&target=_blank' (where '&target=_blank' is an example of an optional pop-out link attribute and value) and then url-encoded per RFC 3986 of the Internet Engineering Task Force ("IETF"). Thus the string specifying the HTTP 'GET' request, in the present example, looks like: 'http://localhost:8080/handlepopoutlink?href=http%3A%2F%2Fexample.com&target=_blank'.

Therefore, 'm_url' in the implementation above would be 'http://localhost:8080/handlepopoutlink' and 'm_data' would be ?href=http%3A%2F%2Fexample.com&target=_blank'.

The URL encoding can be done with the 'curl_escape' method in the 'libcurl' library.

Since the remoting engine 535, in most embodiments, runs on the very same machine as the application that holds the pop-out link, Server Computer 505, the location can be addressed as 'localhost'. In the present embodiment, since the remoting engine 535 is or includes a Java servlet, by default it will listen to 'port' '8080' for incoming HTTP 'GET' requests, so additionally ':8080' is specified. The facility that contains the software code for processing the HTTP 'GET' request exists under a handle, or name (in this case, servlet name) of 'handlepopoutlink', so '/handlepopoutlink' is specified. The assignment of this name can be done in a servlet container's 'web.xml' file.

The remoting engine 535 then inserts a navigation instruction into the communication protocol it uses to communicate with the remoting engine client, Remote Application Window/Remote Graphical Window Engine Client 560 ("remoting engine client" 560). As with the alerting of the remoting engine described above, the insertion can be done by use of components that, taken individually, are well-known to those skilled in the art. While the implementation may vary depending upon the specific computer languages used by the operating system, by the type of remoting engine used, and by the toolset supported on the operating system, a basic approach holds across the variations.

In the present embodiment, the 'curl' program has made an HTTP 'GET' request and passed the data in the Pop-out Link Navigation Event Data 530 to the 'handlepopoutlink' servlet that is part of the remoting engine 535. This servlet runs as part of a larger web application (as described in "Java™ Servlet Specification Version 2.4") that is in fact the remoting engine.

Thus it has access to the memory used by the rest of the remoting engine. This means that it can access the tunnel (such as a Unix i/o socket, or a wrapping of such by a higher-level language such as Java) used by the remoting engine to stream out data representing the current application window/graphical windowing user session window to the client. The servlet can also insert a navigation command, Remoting Protocol Message 540, into this data stream.

A servlet receives data from an HTTP 'GET' request and may act upon it. The example 'handlepopoutlink' servlet takes the data passed by the 'curl' program and inserts it into the data stream handled by this tunnel. To do so, it must distinguish the navigation command, Remoting Protocol Message 540, and any related data from other data in the stream sent by the tunnel, such as that representing the pixels on the screen. Typically, a special character string must be inserted that the client software will be programmed to recognize. This character string can be 'follow_popoutlink' and it is a command for the client software Remote Application Window/Remote Graphical Window Engine Client 560 ("the client") that runs on Client Computer 545.

Note that in the current example, all data is sent as a character stream, including the video data. In the current example, that data is encoded in base64. Therefore, character strings that are commands for the client software can share a single tunnel to the Client Computer 545 and the client 560.

First, as is common with low-level data buffers written to sockets, the length of the command (in terms of string characters) is inserted into the stream, followed by a delimiter, such as the '.' (dot) character, and then the command itself. Following the command will be the data such as the URL or equivalent and, in the present example, the 'target' attribute and value. For efficient processing of the list of data, the client needs to be told how many pieces of data it will need to gather in order to compose the pop-out link.

The next insertion into the data stream is the length in characters of the number of data pieces, which in this case is two (the 'href' identifier with its value, the href value (URL or URI); and the 'target' identifier with its value, the target value (such as '_blank')). The client has been pre-programmed to associate the value following any identifier with that identifier, so the four pieces count as two. And, the client will know that 'http://example.com' following 'href' will be the value of 'href'. Therefore, the character data inserted into the stream may look like: '15.follow_popoutlink,1.2,4.href,19:http://example\com,6.target,6._blank'. It consists of the command, the number of data attributes to associate with the command ('href' and 'target'), the 'href', its value the URL (it could be a URI as well), 'target', and its value (for this example) '_blank'.

Notice that a backslash character has been used to "escape" the dot character in 'example.com'. This tells the client that the dot following the backslash is not a delimiter in the meaning that it is used in '15.follow_popoutlink'. When the client receives the data, the 'WebSocket' 'onmessage' code is called.

This is a program method, more specifically, an event handler, for processing incoming data on the client. This code receives the message stream and parses it, recognizing the special command 'follow_popoutlink' and the following data. Typically, the 'WebSocket' API is used in the JavaScript computer language, so the parsing can be described in JavaScript terms. The incoming data is searched for a following next delimiter (dot character), by using the JavaScript 'indexOf' built-in method. That delimiter marks the end of the number representing the length of the next identifier, such as 'follow_popoutlink' or '_target'. The client code extracts the characters representing the number by starting at the beginning of the current unprocessed stream and getting each character in sequence counting until the dot character.

This can be done in the present embodiment using the value from 'indexOf' and the JavaScript built-in extraction method 'substring'. The client code then gets the number by using the built-in JavaScript method, 'parseInt' on the string data representing the number. Since the dot character also marks the beginning of the identifier, the client code, running in the remoting engine client 560, extracts the whole identifier using the number from 'indexOf' plus one as its starting point and the number it got from the 'parseInt' call, together with the JavaScript 'substring' method.

Once the client code has the identifier, it checks it against a collection of known valid streamed commands by substituting it as a hash key into a collection of program methods using the JavaScript square-bracket syntax. This collection could be named 'streamedCommands' and the variable holding the command identifier extracted by the parsing of the stream could be named 'streamedCommandName'. Using 'streamedCommands[streamedCommandName]' in a JavaScript conditional block allows us to execute the method if it exists: 'if streamedCommands[streamedCommandName]){streamedCommands[streamedCommandName](data);}', where 'data' represents an object holding the data to be optionally used by the program method.

In the case of 'follow_popoutlink', the data passed in would be collected by the parsing means just described, with the additional special protocol logic of reading the number immediately following the 'following_popoutlink' command so as to know how many datums to collect in the stream before bundling them into the above 'data' object and passing them to the streamed command method. This bundling could be accomplished by using JavaScript to create an empty object: 'var data={ };'. Then each identifier and its value, as provided by the parsing code, would be stored in this manner: 'data[identifier]=value', where 'identifier' and 'value' are each variables holding, respectively, the result of extracting (via the parse logic) the identifier, such as 'href' and '_target', and its corresponding value.

The client issues a navigation command, which is done in the streamed command method for 'follow_popoutlink', described above. This program method, in the present example, has the signature '(data)' and is passed the 'data' object described above. It accesses the url in its parameter data at 'data.href'. Additionally, this program method, where the client is running as a standard web application, inspects for a value 'data.target'. If it finds that value, it will use the following JavaScript (with additional optional parameters, if desired): 'window.open(data.href, data.target);'

If the value of the 'target' is '_blank', this will cause the web browser to open a new child web browser window ("child window") or child web browser tab ("child tab"), depending on the user's specific configuration of their web browser. A child (window or tab), when created, is accessible only by the parent (window or tab), and can be controlled from the parent. The parent may set references and values in the child. Otherwise, the child has the same characteristics as the parent. The specific behavior of the web browser depends on the specification of the 'window.open' method, a definition of which is provided at commonly-known online reference sources. But in all subcases of this scenario, the resulting child window would be Top-level Web Container 565.

The child window, child tab, HTML frame, and HTML iframe function as descendants (children at the first level of descendancy) of the parent web browser window. Thus, the parent web browser window must exist before its children can exist, and it creates them if necessary.

If the client code does not find a 'data' property 'target', then the current top-level 'window' container, Top-level Web Container 565, can be filled with the desired content with the following JavaScript command: 'documentlocation.href=data.href'. This command causes the top-level user-interface container that directly hosts the remoting engine client 560 to load itself entirely with fresh content.

A pop-out links-enabled system may additionally support loading a resource indicated by a pop-out link into a portion of the current top-level 'window' container, Top-Level Web Container 565, that is termed an HTML iframe element. An HTML iframe element is a child of the current top-level 'window' container just as a child window is. This action would be specified by a command conforming to a pattern that both the client and server would be programmed to handle. In the preferred embodiment, this would be as a custom HTML attribute, since that would be most easily ignored under local mode. For example, the custom HTML attribute could be 'targetiframe' for target iframe. A preferred embodiment would follow the same rules for target iframes as for target web browser windows and web browser tabs. If the target iframe exists, then it is used; otherwise, a new one is created and referenced by the value of 'targetiframe'. The target iframe creation, referencing and loading code is well known to those skilled in the art. Lastly, the remaining operations on target iframes needed to support pop-out link functionality are the same as for child windows and child tabs. While HTML frames (as distinguished from inline frames, iframes) cannot be created on the fly, they can be targeted by the parent window in the same manner as described above for iframes.

In the case of the pop-out link-initiated redirection described, this would often (but not necessarily) be a new session with a different remote server (like Remote Application Window/Remote Graphical Window Engine 535 on a different Server Computer 505) as illustrated in FIG. 5. Upon the successful loading of the new content (in either the 'href=' scenario or the 'window.open' scenario), the client Web Browser/Web Content Viewport 550 now has a direct connection to the desired resource, instead of the unnecessarily mediated and "nested" one as conventionally implemented.

In another embodiment, more than one client (either more than one Web Browser/Web Content Viewport 550 or more than one Client Computer 545 and more than one Web Browser/Web Content Viewport 550) can use a single computer or virtual machine that is hosting multiple remote multiple remote application windows and/or multiple remote graphical windowing user sessions 510 (with not all being sent to the same client). The application windows and/or graphical windowing user sessions 510 being sent to the client 560 must specially mark the redirection request that they send to the remoting engine 535. If they do not, then there is no way to guarantee that the client that should receive the pop-out link navigation directive will be so redirected. To provide this information, a mechanism must be added that enables all the remote sessions to tell which streaming tunnel of the remoting engine they are connected to.

Such an embodiment consists of a VNC application window(s)/graphical windowing user session(s) (Requested Application 510) running on the remote computer or remote virtual machine, Server Computer 505. Under VNC, the VNC display number is available as an environment variable for all processes running in that VNC application window(s)/graphical windowing user session(s) (also termed a "VNC session") locally on the remote computer/virtual machine. Also, the remoting engine 535 holds the VNC listening port number of all current clients (the Web Browser/Web Content Viewports 550 used by the search bots to gather the remote application windows/remote graphical windowing user sessions) as well as the addresses of those VNC sessions running locally on the remote computer/virtual machine to capture and transmit the state of Requested Application 510.

Additionally, the VNC listening port number is related to its display number. For example, on a given remote computer/virtual machine, port 5901 can be mapped to display number ":1", and port 5902 mapped to ":2", etc.

The VNC display number can be sent as an HTTP 'GET' string-encoded parameter to the 'curl' program (described above), thereby including the necessary additional datum to the remoting engine 535. The application containing the document or other content holding the pop-out link clicked on by the user in the present example knows, as described above, the current VNC display number from an environment variable, typically on Unix and Linux systems '$DISPLAY'. Therefore, it can add the current VNC display number to its parameters to the 'curl' program in the same manner as described above, but with the additional parameter.

In this embodiment, the string form of the HTTP 'GET' request (holding the data from Pop-out Link Navigation Event Data 530) would be, in url-encoded format: 'http://localhost:8080/handlepopoutlink?href=http%3A%2F%2Fexample.com&target=blank&vnc_num=%3A1'. Then, the 'curl' program can make an HTTP 'GET' request from that string. Notice the identifier near the end of this character string, 'vnc_num'. 'vnc_num' is a proper HTTP 'GET' parameter in an HTTP parameter and value pair since it is preceded by the character '&' and followed by the character '=', with the value following the '=' character being its assigned value. This identifier, in the syntax described, enables the servlet that receives this HTTP 'GET' request to get the VNC display number (in url-unencoded form) ':1'.

From there, the streaming tunnel of the client 560 listening on port 5901 (following the mapping described above (here, ':1' to '5901') can be determined. Since the remoting engine 535 must track which port goes with which streaming tunnel (with each streaming tunnel going to only a single client 560), it can then insert the pop-out link navigation command into the correct stream. The correct client 560 then receives it, and follows it in the same fashion as described above under the single client embodiment.

That which is claimed is:

1. A system comprising:
a client computing device configured to run a remoting engine client, via a search engine web crawler that utilizes a web view in order to fetch and internally render content at given URLs or URIs;
a server computing device configured to run a remoting engine hosting a remote graphical computer desktop, remote graphical application window, or remote graphical windowing user session;
the system configured to perform:
establishing a remote graphical computer desktop, remote graphical application window, or remote graphical windowing user session between the client computing device and the server computing device;
marking a navigational link, without altering the link's destination URL path or URI path, on the remote graphical computer desktop, remote graphical application window, or remote graphical windowing user session, as a pop-out link, wherein the pop-out link includes an identifier recognizably different from a standard navigational link;
upon navigation action on the pop-out link by the search engine web crawler that is viewing the remote graphical computer desktop, remote graphical application window, or remote graphical windowing user session:
a) parsing, by a link parsing routine executed by a processor, navigation data from the pop-out link;
b) sending, by a processor, the pop-out link navigation data to a Remoting Engine that is providing the remote graphical computer desktop, remote graphical application window, or remote graphical windowing user session;
c) sending, by a processor, over a network, a navigation command to the remoting engine client running on the search engine web crawler web view;
d) reloading, by a processor, a search engine web crawler web view's top level container with content provided at the pop-out link's destination URL or URI.

2. The system of claim 1, wherein the pop-out link's destination URL or URI provides a remote graphical computer desktop, remote graphical application window, or remote graphical windowing user session.

3. The system of claim 1, wherein when hosting multiple remote desktops and/or multiple remote application windows and/or multiple remote graphical windowing user sessions, a message sent to the Remoting Engine to reload the search engine web crawler web view's top level container specifies a network port number for a correct remote desktop, remote application window, or remote graphical windowing user session.

4. The system of claim 1, wherein the search engine web crawler web view is directed to load a whole web page context into a child of a search engine web crawler web view's top level container leaving the search engine web crawler web view's top level container unaltered by the navigation action.

5. The system of claim 4, wherein the child of the search engine web crawler web view's top level container is an HTML frame.

6. The system of claim 4, wherein the child of the search engine web crawler web view's top level container is new.

7. The system of claim 4, wherein the child of the search engine web crawler web view's top level container is pre-existing.

8. The system of claim 1, wherein the pop-out link includes overloading a pre-existing or predefined HTML attribute.

9. The system of claim 1, wherein the pop-out link includes a new custom HTML attribute.

10. The system of claim 1, wherein the pop-out link includes a new HTTP 'GET' parameter.

11. The system of claim 1, wherein the pop-out link includes a special identifier in place of a standard Internet Protocol scheme identifier 'http' or 'https'.

12. An apparatus comprising at least one processor configured to run a remoting engine hosting a remote graphical computer desktop, remote graphical application window, or remote graphical windowing user session, the at least one processor configured to perform:
establishing a remote graphical computer desktop, remote graphical application window, or remote graphical windowing user session between the server computing device and a client computing device configured to run a remoting engine client, via a search engine web crawler that utilizes a web view in order to fetch and internally render contents at given URLs or URIs;
marking a navigational link, without altering the link's destination URL path or URI path, on the remote graphical computer desktop, remote graphical application window, or remote graphical windowing user session, as a pop-out link, wherein the pop-out link includes an identifier recognizably different from a standard navigational link;
upon navigation action on the pop-out link by the search engine web crawler that is viewing the remote graphical computer desktop, remote graphical application window, or remote graphical windowing user session:
a) parsing, by a link parsing routine executed by a processor, navigation data from the pop-out link;
b) sending, by a processor, the pop-out link navigation data to a Remoting Engine that is providing the remote graphical computer desktop, remote graphical application window, or remote graphical windowing user session;
c) sending, by a processor, over a network, a navigation command to the remoting engine client running on the search engine web crawler web view to reload the search engine web crawler web view's top level container with content provided at the pop-out link's destination URL or URI.

13. The apparatus of claim 12, wherein the pop-out link's destination URL or URI provides a remote graphical computer desktop, remote graphical application window, or remote graphical windowing user session.

14. The apparatus of claim 12, wherein when hosting multiple remote desktops and/or multiple remote application windows and/or multiple remote graphical windowing user sessions, a message sent to the Remoting Engine to reload the search engine web crawler web view's top level container specifies a network port number for a correct remote desktop, remote application window, or remote graphical windowing user session.

15. The apparatus of claim 12, wherein the search engine web crawler web view is directed to load a whole web page context into a child of a search engine web crawler web view's top level container leaving the search engine web crawler web view's top level container unaltered by the navigation action.

16. The apparatus of claim 12, wherein the pop-out link includes overloading a pre-existing or predefined HTML attribute.

17. The apparatus of claim 12, wherein the pop-out link includes a new custom HTML attribute.

18. The apparatus of claim 12, wherein the pop-out link includes a new HTTP 'GET' parameter.

19. The apparatus of claim 12, wherein the pop-out link includes a special identifier in place of a standard Internet Protocol scheme identifier 'http' or 'https'.

* * * * *